(12) United States Patent
Koenders (10) Patent No.: US 7,527,841 B2
(45) Date of Patent: May 5, 2009

(54) METHOD FOR DISSOLVING PPTA IN SULFURIC ACID USING A TWIN SCREW EXTRUDER

(75) Inventor: Bernardus Maria Koenders, Westervoot (NL)

(73) Assignee: Teijin Aramid B.V., Arnhem (NL)

( * ) Notice: Subject to any disclaimer, the term of this patent is extended or adjusted under 35 U.S.C. 154(b) by 103 days.

(21) Appl. No.: 11/663,980

(22) PCT Filed: Oct. 20, 2005

(86) PCT No.: PCT/EP2005/011262

§ 371 (c)(1),
(2), (4) Date: Mar. 28, 2007

(87) PCT Pub. No.: WO2006/045517

PCT Pub. Date: May 4, 2006

(65) Prior Publication Data

US 2008/0085978 A1  Apr. 10, 2008

(30) Foreign Application Priority Data

Oct. 22, 2004 (EP) .................... 04025141

(51) Int. Cl.
*B29C 70/08* (2006.01)
(52) U.S. Cl. .............. 428/36.3; 428/364; 428/395; 264/143; 264/176.1; 264/211.21; 264/182; 57/417; 528/310
(58) Field of Classification Search ............... 528/272, 528/271, 288, 310; 525/418, 419, 420, 432, 525/435, 436; 428/364, 394, 395, 35.7, 36.3; 425/203, 208, 425; 264/176.1, 211, 211.21, 264/141, 143 C, 182, 184; 366/318, 323; 422/129, 131; 57/400, 417
See application file for complete search history.

(56) References Cited

U.S. PATENT DOCUMENTS

| 4,622,265 | A | * | 11/1986 | Yoon et al. .................. 428/364 |
| 5,741,848 | A | * | 4/1998 | Nogata et al. ............... 524/587 |
| 6,187,877 | B1 | * | 2/2001 | Gotz et al. .................... 526/65 |
| 2004/0022981 | A1 | * | 2/2004 | Hu et al. .................... 428/36.9 |

FOREIGN PATENT DOCUMENTS

| EP | 1 435 407 A | 7/2004 |
| NL | 8500429 A | 4/1986 |
| WO | WO 96/33234 A1 | 10/1996 |

* cited by examiner

*Primary Examiner*—Irina S Zemel
*Assistant Examiner*—Frances Tischler
(74) *Attorney, Agent, or Firm*—Oliff & Berridge, PLC (57) ABSTRACT

Described is a method for dissolving PPTA or copolymers thereof in sulfuric acid using a twin screw extruder having transporting, mixing, and kneading elements with an entering zone, an intermediate zone, a mixing zone, a negative transport zone, a degassing zone, and a pressure build-up zone. The method includes transporting PPTA or copolymer thereof into the entering zone at a transport capacity low enough as to prevent sulfuric acid entering the entering zone; introducing sulfuric acid in the intermediate zone; essentially fully filling the mixing zone to allow sufficient time to mix and dissolve PPTA or copolymer thereof in the sulfuric acid to obtain a PPTA or copolymer-sulfuric acid solution; creating after the mixing zone a negative transport zone to obtain a product lock between the mixing zone and the degassing zone; creating a thin film of the PPTA or copolymer-sulfuric acid solution in the degassing zone to degas the solution; and entering the solution into the output pressure build-up zone to partially fill this zone and to leave the twin screw extruder.

22 Claims, 3 Drawing Sheets

Long lead    Short lead

METHOD FOR DISSOLVING PPTA IN SULFURIC ACID USING A TWIN SCREW EXTRUDER

BACKGROUND OF THE INVENTION

1. Field of Invention

The present invention relates to a method for dissolving poly(paraphenylene-terephthalamide) (hereinafter "PPTA") or copolymers in sulfuric acid using a twin screw extruder.

2. Description of Related Art

Traditionally, methods for dissolving PPTA include dissolving PPTA in liquid sulfuric acid in a reactor or kneader and degassing the formed solution. This method takes about 4 hours at a temperature of 85° C., which causes degradation of the polymer or copolymer. Alternatively, mixing PPTA with (frozen) sulfuric acid ice is performed at low temperature (below 25° C.), followed by melting and degassing the produced solid solution. The method takes about 6 hours and has a large residence time distribution. This process is limited to mixtures having a PPTA-content between 17.5 and 19.8 wt. %. Below 17.5 wt. % PPTA in sulfuric acid, a substantial amount of off-spec material is formed. Further, copolymers cannot be dissolved or are only to dissolve with difficulties because the formed solid solutions become too sticky and/or formed into big lumps that cannot easily be processed further. These known methods thus have inherent disadvantages.

Twin screw extruders are typically used to mix and extrude polymers. For instance, in NL 8500429, a polyethylene mixture was obtained by using a twin screw extruder. The mixture is suitable for making tapes, films, tubes, and the like. In other publications, for instance in EP 821708, a twin screw extruder is described for use in polymerizing an aliphatic diamine and an aliphatic dicarboxylic acid to obtain a non-aromatic polyamide, such as nylon. Use of polymers other than polyethylene or polyamide, or methods for making a spin dope, were not disclosed.

SUMMARY

It is an objective of the invention to provide a solution to the above problems. To this end, a new method has been developed, which is devoid of the above disadvantages. The invention thus relates to a method for dissolving PPTA or copolymers thereof in sulfuric acid using a twin screw extruder having transporting, mixing, and kneading elements comprising an entering zone, an intermediate zone, a mixing zone, a negative transport zone, a degassing zone, and a pressure build-up zone, the method comprising the steps:

transporting PPTA or copolymer thereof into the entering zone at a transport capacity low enough as to prevent sulfuric acid entering the entering zone;

entering sulfuric acid in the intermediate zone at high shear conditions to remove the optionally formed gel layer;

Introducing sulfuric acid in the intermediate zone;

essentially fully filling the mixing zone to allow sufficient time to mix and dissolve PPTA or copolymer in the sulfuric acid to obtain a PPTA sulfuric acid solution or copolymer sulfuric acid solution;

creating, after the mixing zone, a negative transport zone to obtain a product lock between the mixing zone and the degassing zone;

creating a thin film of the PPTA sulfuric acid solution or copolymer sulfuric acid solution in the degassing zone to degas the solution; and entering the solution into a pressure build-up zone to partially fill this zone and to leave the twin screw extruder.

BRIEF DESCRIPTION OF DRAWINGS

The invention is illustrated by the following figures.

DETAILED DESCRIPTION OF EMBODIMENTS

Figure 1A:
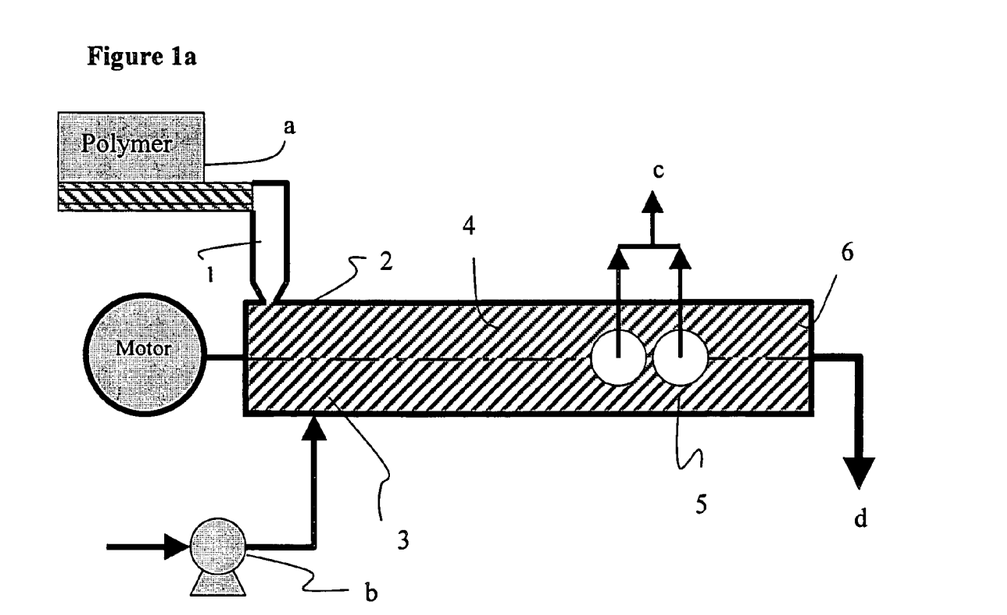
FIGS. 1a and 1b shows a schematic view of a twin screw extruder.

A schematic figure of a twin screw extruder as used in the invention is shown in FIG. 1a. PPTA and/or copolymer thereof (a) is dosed into the entering zone or hopper 1 of the extruder and transported to an intermediate zone 2. Sulfuric acid (b) is injected into the extruder in the intermediate zones 2 and 3. The sulfuric acid (b) is not injected in the entering zone 1 to prevent the sulfuric acid (b) from flowing back into the hopper which will cause severe problems. The sulfuric acid (b) with the PPTA polymer or copolymer (a) is transported to a mixing section 4. In the mixing zone 4, the PPTA polymer or copolymer (a) and sulfuric acid (b) are intensively mixed. Mixing by mixing elements generates a lot of heat dissipation so that simultaneously to the mixing process the dissolution process will take place. The heat dissipation during mixing and the dissolution energy is enough to almost carry out the total process adiabatically. After the PPTA polymer or the copolymer has been dissolved, the dissolution can be degassed. To carry out a degassing process, first a product lock is implemented in a negative transport zone 5. Now the dissolution can be degassed under low pressure (c), for example, 40 mbar absolute. The degassed solution, a so called spin-dope (d), is transported at a certain pressure out of the extruder by a pressure build-up zone 6.

Figure 1B:
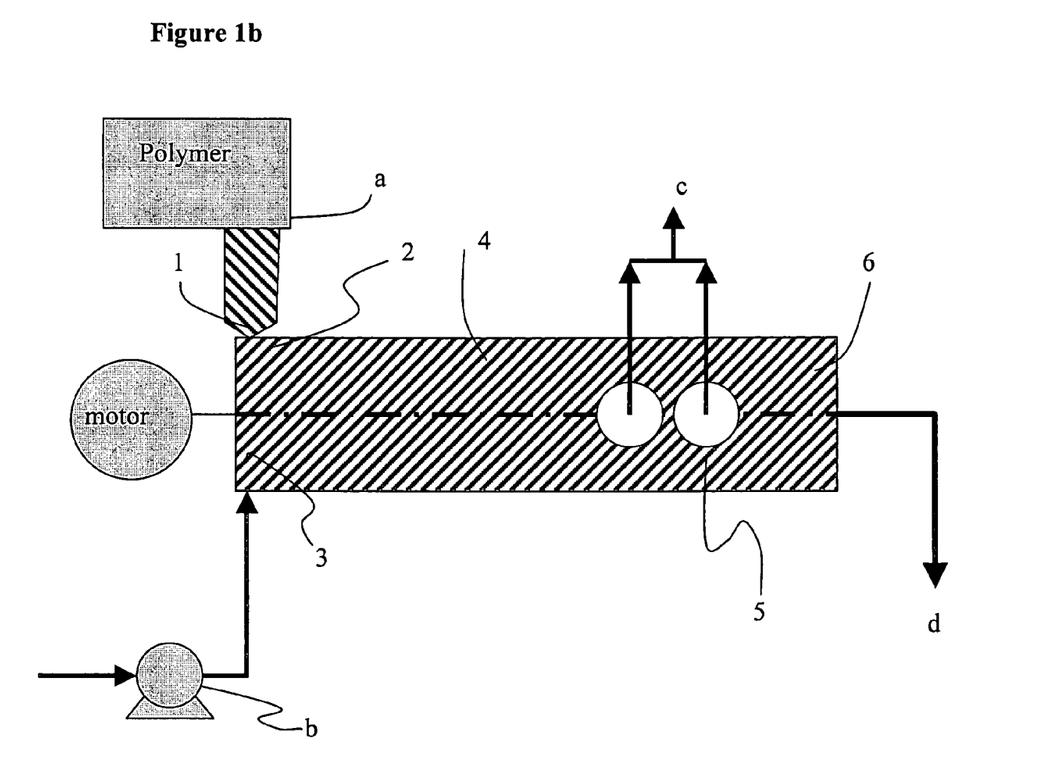

A schematic figure of another twin screw extruder as used in the invention is shown in FIG. 1b. The PPTA polymer and/or the copolymer is dosed into the entering zone 1 of the extruder. Sulfuric acid (b) is injected into the extruder and together with the PPTA polymer or copolymer is transported to the mixing zone 4. In the mixing zone 4, the PPTA polymer or copolymer and sulfuric acid (b) are intensively mixed. The mixing by the mixing elements generates a lot of heat dissipation so that simultaneously to the mixing process, the dissolution process will take place. The heat dissipation during mixing and the dissolution energy is enough to almost carry out the total process adiabatically. After the PPTA polymer or the copolymer has been dissolved, the dissolution can be degassed. To carry out a degassing process, first a product-lock is implemented in the negative transport zone 5. Now the dissolution can be degassed under the low pressure (c), for example, 40 mbar absolute. The degassed solution, a so called spin-dope (d), is transported at a certain pressure out of the extruder by the pressure build-up zone 6.

Figure 2A:
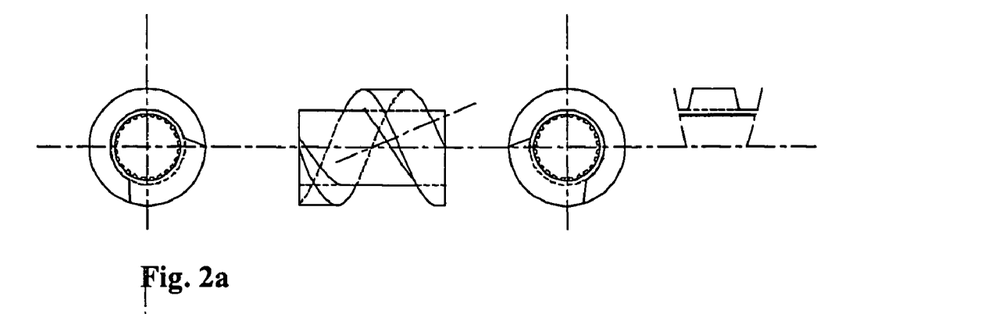
FIGS. 2a and 2b show a single and double flighted transport element.
Figure 2B:
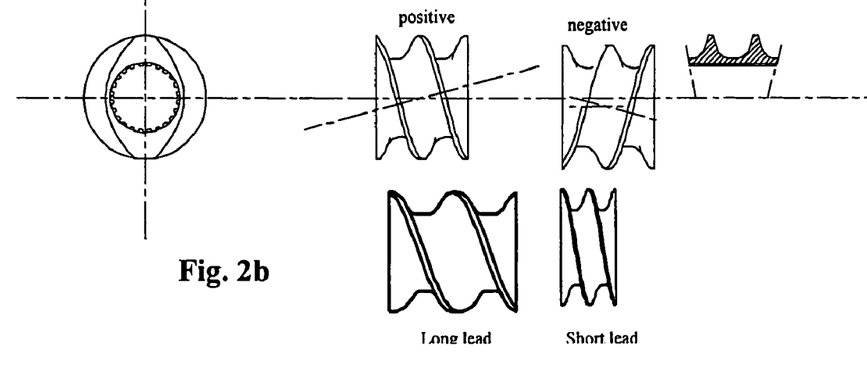

In FIGS. 2a and 2b, positive and negative conveying elements are shown that are used in several zones or sections of the extruder, such as, for example:

a) In the entering zone 1 of the extruder, the conveying elements have the function to transport the PPTA polymer or copolymer towards the mixing section 4 without compacting the polymer or copolymer. Compacting the polymer or copolymer leads to agglomerates of the polymer or copolymer which are more difficult to dissolve. In this zone, single (FIG. 2a) and double flighted positive (FIG. 2b) long lead conveying elements can be used.

b) In the product-lock, the conveying elements have the function to form a barrier between the mixing zone 4 and a degassing zone. This barrier, the product-lock, is achieved by negative conveying elements. To achieve an efficient product-lock, there should be used short lead elements, the length being defined short with respect to the length of the extruder. Suitable lengths are within the range from about 0.5 D to about 0.75 D. "D" refers to a diameter of the screw in mm.

c) In the degassing zone, the conveying elements have the function to create a thin film in the degassing zone, meaning that the elements should give a strong transport. To achieve a strong transport, long lead elements should be used. Suitable lengths for the long lead elements are about 1.25 D to about 3 D.

d) In the pressure build-up zone, the conveying elements have the function to create a pre-determined pressure level within a short path in the extruder. To create this pressure level efficiently, the conveying elements should have a short lead. Suitable lengths for the short lead are about 0.5 D to about 0.75 D.

Figure 3:
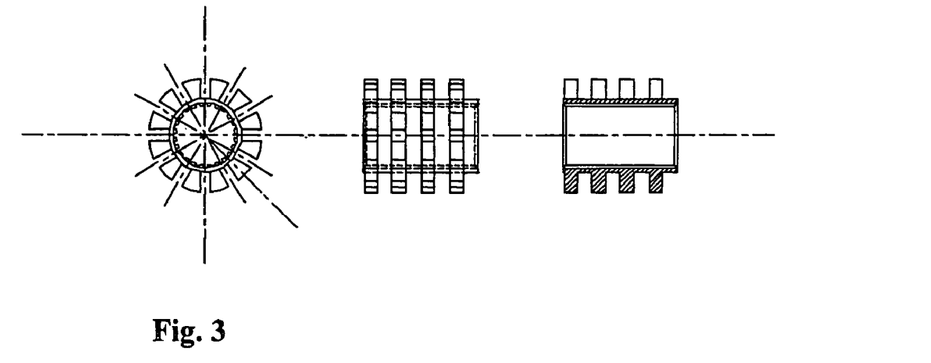
FIG. 3 shows transport element with a mixing element.

In FIG. 3, transport-free elements are shown that are used in the mixing zone 4 of the extruder. Major functions of these elements are:

distributively mixing PPTA polymer or copolymer and sulfuric acid to remove a gel-blocking layer around a polymer particle of low concentrated PPTA polymer or copolymer in sulfuric acid; and dissolving the PPTA polymer or copolymer in the sulfuric acid. This dissolution process is a diffusion-related process requiring an amount of time. Therefore, mixing elements without transport function should be used in the mixing zone 4.

Figure 4:
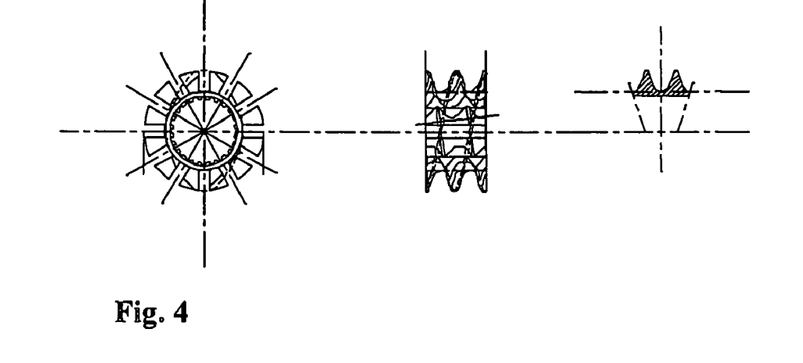
FIG. 4 shows a mixing element without transporting.

FIG. 4 shows interrupted flight elements, which are used in the mixing zone of the extruder.

Major functions of these elements are:

transporting the PPTA (or copolymer thereof)/sulfuric acid through the mixing elements and through the product lock; and distributively mixing PPTA (or copolymer thereof) and sulfuric acid and partly removing a gel-blocking layer around the polymer particle of low concentrated PPTA (or copolymer thereof) in sulfuric acid Therefore, transport elements with interrupted flights have to be used in the mixing zone 4.

The screw configuration can be constructed with a number of different elements such as transporting, mixing, and kneading elements. To carry out the process of dissolving PPTA polymer or copolymer in sulfuric acid, the following screw configuration is preferred:

the entering zone element has preferably a length of 1-6 D, more preferably 3-6 D and can have a length as large as 6 D to 9 D and is equipped with transport elements which are single or double flighted. In FIGS. 2a and 2b, single and double flighted constructions are shown, respectively. The single and double flighted elements are well known conveying elements which do not cause compaction of the polymer or copolymer during conveying;

the mixing zone 4 and dissolution zone have a length of 15 D to 30 D, and preferably of 20 D to 23 D, and use elements without transport character (see FIG. 3). These elements may be, for example W&P Igel or Hedgehog and or single/multi row tooth mixing ZME, Berstorff single or multi row tooth mixing ZB, and Clextral multi row tooth mixing BMEL. The elements may have interrupted transport character (see FIG. 4), such as W&P type SME or Berstorff type EAZ-ME. The mixing elements without transport character are characterized in that they do not cause conveying and that they are therefore totally filled-up with product, having dispersive mixing character. The mixing elements with interrupted transporting character have a channel with conveying character. These elements have distributive mixing character and are not necessarily totally filled-up;

the product lock between the dissolution and the degassing process has been constructed with negative transport elements with a length of 0.1 D to 10 D, preferably about 1 D. The negative transport elements have an anti clockwise channel and therefore cause backward transport; and the degassing zone has a length of 2-20 D, preferably 6-8 D and is equipped with transport elements to obtain a thin film for a short degassing time. These elements are transport elements with a long lead and a strong conveying character.

The pressure build-up zone 6 has a length of about 2-20 D, and preferably about 6-8 D, and is constructed with transport elements. These elements are transporting elements with a short lead, such as two flights over a length of 0.5 D and a strong conveying character.

The method of the invention is taking place in less than 30 minutes (hereinafter "min"), often between 2 and 10 min, and usually in about 4-6 min. Due to the short residence time, hardly any degradation occurs.

The short dissolution times are particularly important when changing to another concentration, which will take about 4 times the residence time. Thus, this method with its short residence times is economically attractive when different product types are produced. The method is also very suitable for adding additives to the polymer or copolymer, such as colorants, conductive agents, friction-modifying agents, and the like. Those additives can be added at any zone of the extruder, and preferably at the beginning of the extruder. Solids, for instance, can advantageously be added to the hopper. All sorts of PPTA or copolymer concentrations can be prepared by using the present method because there is no solid solution stage which in the prior art methods causes a lot of off-spec material at low concentrations or with copolymers.

Because of the excellent mixing character, the process in the twin screw extruder can also be used to efficiently mix nanoparticles into the prepared solution of polymer or copolymer. The use of twin screw extruders according to this invention allows very fast dissolution of PPTA or other aramid polymers or copolymers in sulfuric acid, has further the advantage that mixing, degassing, and pressure building are performed in one apparatus, and that any aramid polymer or copolymer in any concentration can be used. The process can be performed on-line in combination with a spinning process, and leads to a product having improved properties and decreased degradation.

Further, the total investment of equipment for the dissolution process is lower than the required investments for the known routes, as the total energy consumption for the total dissolution process is lower than for the prior art methods.

Surprisingly, it was also found that yarns that were spun with spin dopes made according to this new method have better mechanical properties, such as higher tenacities, elongation at break and breaking energies, and lower modulus than similar yarns spun with known spin dopes. It is therefore also an objective of the invention to provide yarns with these improved properties.

The invention is further illustrated by the following non-limitative examples that only serve to clarify the invention.

The Dosing Systems

The dosing of the PPTA polymer or copolymer is taking place in the entering zone 1 of the extruder (hopper). The dosing of the PPTA polymer or copolymer is carried out by, for example, a Loss in Weight system. Because of the fact that the dissolution equipment has hardly any buffer capacity, the dosing system should have a high accuracy.

The dosing system of the sulfuric acid, also known as $H_2SO_4$, is taking place after the entering zone 1. The dosing of $H_2SO_4$ is carried out with a gear pump or a 3-headed plunge pump. The flow of $H_2SO_4$ was measured with a coriolis tube with backwards controlling of the frequency of the pump in order to dose the required amounts of $H_2SO_4$. Because the dissolution equipment has hardly any buffer capacity, the dosing system should have a high accuracy.

Dissolving PPTA polymer or copolymer in $H_2SO_4$ is taking place in a twin screw extruder made of material which is resistant against wear and tear of the process. The screw configuration of the extruder preferably meets a number of specifications, such as, for example:

the transport in the entering zone is constructed in such a way that the transport capacity for PPTA/$H_2SO_4$ is sufficient to prevent any $H_2SO_4$ from coming into the hopper of the extruder, causing severe problems;

the mixing/dissolution zone is constructed in such a way that this zone is substantially fully to fully filled to give the dissolution process sufficient time, without introduction of hot spots in this zone and achieving maximum capacity for the dissolution;

after the mixing/dissolution zone, a negative transport zone is constructed to create a product lock between dissolution and degassing;

the degassing zone is constructed in such a way that a thin film of PPTA/$H_2SO_4$ dissolution is created to degas the solution in a very short time, such as, for example, 2 to 8 sec; and the pressure build-up zone is constructed in such a way, such as by the rpm of the extruder and the length of the pressure build-up elements that with a standard output pressure, this zone is filled up for 50%.

The invention is illustrated by the following non-limitative examples.

GENERAL PROCEDURES

Determination of the Linear Densities

The method described is suitable for the determination of linear densities of all types of p-aramid filament yarn, having a nominal linear density (LD) of 200 to 25,000 decitex (hereinafter "dtex").

Principle

Linear density (LD) is determined by weighing a measured length of yarn conditioned in the form of a skein. This length of yarn is measured under specified tension. The unit of LD is dtex; one dtex being defined as the mass of one gram per 10,000 meters length.

Procedure

The yarn is pre-dried in a ventilated oven of 45±5° C. Standard atmosphere: temperature of 20±2° C. at a relative humidity of 65±2%. Standard pretension in the yarn during winding is 5±3.0 mN/tex, calculated on the basis of the nominal LD.

Determination of the Linear Density

Using a precision reel, make up a skein under pretension. The length L of the skein, which depends upon the nominal linear density, is indicated in the Table below.

TABLE 1

| Length of skein | |
|---|---|
| Nominal linear density (dtex) | Length of skein (meters) |
| 200-6000 | 20 |
| 6,000-25,000 | 10 |

Calculation

The linear density (LD) of each skein is calculated with the formula:

$$LD(dtex) = \frac{M \times 10}{L}$$

wherein:
M=mass of skein (mg)
L=length of skein (m)

The linear density (LD) is calculated as the average of n determinations, including the standard deviation $s_{n-1}$. The average values are given as $$LD = dtex\ (s_{n-1})$$

Determination Of The Force-Elongation

The method is suitable for the determination of the force-elongation properties of all types of Twaron filament yarns, having a nominal LD of 200 to 50,000 dtex.

Principle

The specimen (provided with protective twist) is mounted in the clamps of a tensile testing machine (CRE-type), which is operated until rupture. The breaking force (hereinafter "BF") and the elongation at break (hereinafter "EAB"), and various other tensile properties are given by a computer system connected to the tester.

Pneumatically Closing Clamps:

For LD up to 10,000 dtex, clamps with a wrap of 180° are used, for example Instron cat. No. 2714-032 (formerly type 4D). The clamps may be provided with an enlarged cylinder diameter for higher clamping force. For LD between 10,000 and 50,000 dtex, clamps with a wrap of 270° are used, such as Instron cat. No. 2714-107. The clamping blocks must be highly polished. The amount of twist to be inserted is given is based on the equation:

$$YT(tpm) = \frac{(1055 \pm 50)}{\sqrt{LD}}$$

wherein:
YT=yarn twist
LD=linear density in tex

For LD above the 10,000 dtex, a YT of 30 tpm has to be inserted. Pre-dry the twisted yarn on the twisting bobbin for 3 hours in the ventilated oven at 50±5° C. and subsequently condition for at least 16 hours in the standard atmosphere (temperature of 20±2° C. at relative humidity of 65±2%). The number of determinations per laboratory sample is n=3 (clamp breaks not included).

Calculation

Breaking strength (N) (hereinafter "BS") is calculated as the average of n determinations BF.

Elongation at break EAB is calculated as follows:

$$EAB(\%) = \frac{E \times 100}{L_0}$$

wherein:
$L_o$=initial length (mm), length at a pretension of 20 mN/tex.
E=extension (mm) from the initial length to the extension at breaking force.

For the slack start procedure, the initial length is calculated as follows:

$$L_o = (L_s + D)$$

wherein:
$L_s$=gage length (mm) at the start
D=the displacement (mm) of the moving clamp from the start position to the position where the force is equal to the specified pretension.

Breaking tenacity (hereinafter "BT") is calculated from the measured value of breaking force BF(N) and the measured value of LD (dtex) by means of the following formula:

$$BT(mN/tex) = \frac{BF(N)}{LD(dtex)} \times 10^4$$

The chord modulus (CM) in a force-elongation curve is the ratio of the change in force to the change in elongation between two specified points on the curve. The formula for a CMA calculation is as follows:

$$CMA(N/tex) = \frac{(F_1 - F_2)}{(E_1 - E_2)} \times \frac{10^3}{LD}$$

wherein:
$F_1$=force in N for point 1 corresponding to 400 mN/tex
$F_2$=force in N for point 2 corresponding to 300 mN/tex
$E_1$=elongation in % for $F_1$
$E_2$=elongation in % for $F_2$
LD=linear density in dtex.

To obtain the chord modulus in GPa; multiply the value in N/tex with the density (D) in g/cm³.

$$CMA(GPa) = CMA(N/tex) \times D(g/cm^3)$$

The results of the n determinations are averaged and the corresponding standard deviation $s_{n-1}$ is calculated and reported as BS=.N($s_{n-1}$)

EXAMPLE 1

17 weight parts of PPTA were dosed into the twin screw extruder. 83 weight parts of $H_2SO_4$ were injected into the twin screw extruder (after the 2nd barrel). The sulfuric acid has a purity of 99.8%. The extruder speed was about 250 rpm. The vacuum for degassing was 40 mbar (absolute pressure). The output pressure extruder was 40 bar. The dissolving capacity was 30 kg/h. The temperature of the dissolving process was 85° C. The mechanical properties are illustrated in Table 2.

TABLE 2

| Linear Density [dtex] | Breaking Tenacity [mN/tex] | Elongation at break [%] | CMA 300400 modulus [GPa] | ToAR [J/g] |
|---|---|---|---|---|
| 965 | 2201 | 4.20 | 69.8 | 46.4 |
| 967 | 2177 | 4.2 | 69.4 | 46 |
| 1365 | 2159 | 4.51 | 63.0 | 48.7 |
| 1369 | 2158 | 4.53 | 61.6 | 48.7 |
| 1370 | 2165 | 4.48 | 63.6 | 48.4 |
| 1612 | 2001 | 4.3 | 59.7 | 43 |
| 1699 | 2064 | 4.63 | 56.0 | 47.2 |
| 1697 | 2012 | 4.50 | 56.6 | 44.7 |
| 2077 | 1936 | 4.69 | 52.6 | 44.9 |
| 2087 | 1955 | 4.68 | 52.9 | 45.4 |
| 2088 | 1931 | 4.68 | 52.55 | 45.0 |
| 2089 | 1931 | 4.61 | 52.9 | 43.9 |

EXAMPLE 2

19.5 weight parts of PPTA were dosed into the twin screw extruder. 81.5 weight parts of $H_2SO_4$ (capacity 28.2 kg/h) were injected into the twin screw extruder (after the 2nd barrel). The extruder speed about was 250 rpm. The vacuum for degassing was 40 mbar (absolute pressure). The output pressure extruder was 40 bar. The temperature of the dissolving process was 85° C. The mechanical properties are illustrated in Table 3.

TABLE 3

| Linear Density [dtex] | Beaking Tenacity [mN/tex] | Elongation at break [%] | CMA 300400 modulus [GPa] | ToAR [J/g] |
|---|---|---|---|---|
| 951 | 2507 | 3.72 | 83.6 | 45.0 |
| 953 | 2531 | 3.74 | 84.5 | 45.7 |
| 1376 | 2365 | 3.75 | 77.2 | 42.6 |
| 1375 | 2412 | 3.84 | 76.7 | 44.3 |
| 1369 | 2449 | 3.79 | 80.6 | 45.0 |
| 1675 | 2372 | 3.96 | 73.8 | 45.4 |
| 1694 | 2312 | 3.93 | 70.1 | 43.2 |
| 1680 | 2395 | 3.99 | 73.6 | 46.0 |
| 2111 | 2340 | 4.10 | 67.7 | 45.5 |
| 2096 | 2348 | 4.19 | 66.0 | 46.5 |
| 2098 | 2345 | 4.11 | 67.8 | 45.6 |

COMPARISON EXAMPLE 3

19.5 weight parts of PPTA and 81.5 weight parts of $H_2SO_4$ were dissolved and spun according to the prior art method (dissolved in $H_2SO_4$ ice). The mechanical properties are illustrated in Table 4.

TABLE 4

| Linear Density [dtex] | Beaking Tenacity [mN/tex] | Elongation at break [%] | CMA 300400 modulus [GPa] | ToAR [J/g] |
|---|---|---|---|---|
| 950 | 2360 | 3.7 | 82 | 41 |
| 1370 | 2350 | 3.7 | 82 | 42 |
| 1680 | 2340 | 3.9 | 72 | 43 |
| 2100 | 2310 | 4.1 | 66 | 44 |

Figure 5:
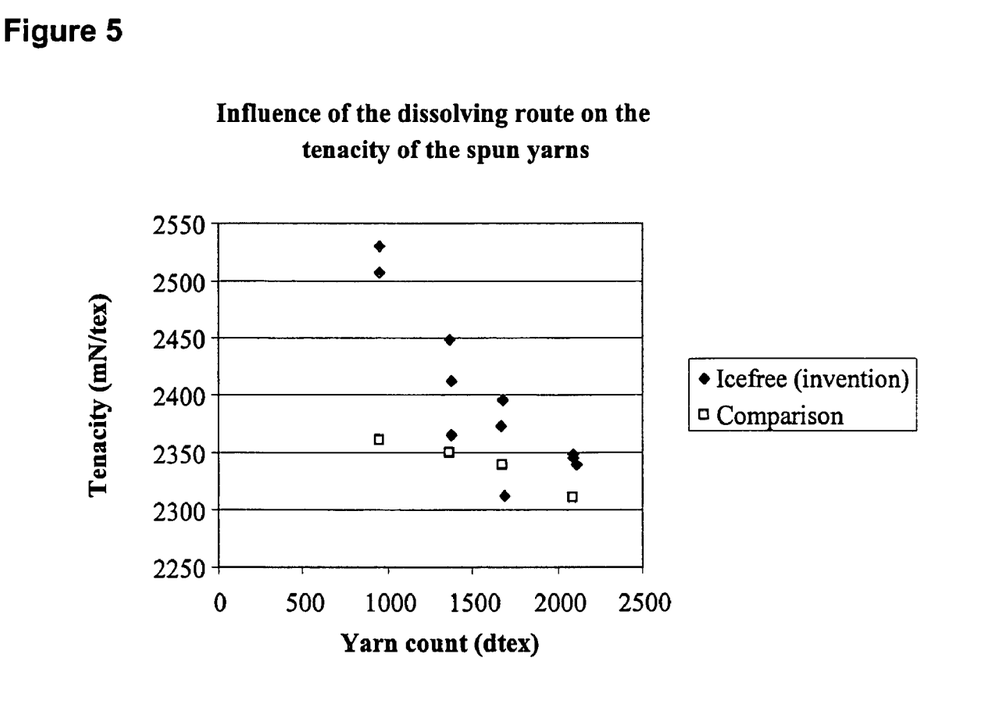
FIG. 5 shows a graph illustrating an influence of a dissolving route with respect to a tenacity of spun yarns.

In FIG. 5, the difference between the presently claimed yarns and the prior art yarns are depicted graphically.

EXAMPLE 4

19 weight parts of PPTA/NDC copolymer (30% NDC=2, 6-naphthalene dicarboxylic acid dichloride) were dosed into the twin screw extruder. 81 weight parts of $H_2SO_4$ were injected into the twin screw extruder (after the 2nd barrel). The sulfuric acid has a purity of 99.8%. The extruder speed was about 250 rpm. The vacuum for degassing was 40 mbar (absolute pressure). The output pressure of the extruder was 30 bar. The dissolving capacity was 30 kg/h. The temperature of the dissolving process was 85° C. The mechanical properties are illustrated in Table 5.

TABLE 5

| Linear Density (dtex) | Breaking Tenacity (mN/tex) | Elongation at break % | CMA 300400 modulus (GPa) | ToAR (J/g) |
|---|---|---|---|---|
| 1954.6 | 1951 | 4.74 | 75.6 | 48.2 |
| 1968.5 | 1917 | 4.68 | 76.2 | 47.1 |
| 1940.1 | 2005 | 4.70 | 77.8 | 48.8 |
| 1740.9 | 2026 | 4.53 | 81.8 | 47.9 |

EXAMPLE 5

19 weight parts of PPTA/DABPI copolymer (10% DAPBI=5(6)-amino-2-para-aminophenyl)benzimidazole) were dosed into the twin screw extruder. 81 weight parts of $H_2SO_4$ were injected into the twin screw extruder (after the 2nd barrel). The sulfuric acid has a purity of 99.8%. The extruder speed was about 250 rpm. The vacuum for degassing was 40 mbar (absolute pressure). The output pressure of the extruder was 60 bar. The dissolving capacity was 30 kg/h. The temperature of the dissolving process was 85° C. The mechanical properties are illustrated in Table 6.

TABLE 6

| Linear Density (dtex) | Breaking Tenacity (mN/tex) | Elongation at break % | CMA 300400 modulus (GPa) | ToAR (J/g) |
|---|---|---|---|---|
| 1789.5 | 2057 | 3.87 | 85.4 | 42 |
| 1481.0 | 2051 | 3.849 | 86.4 | 41.1 |
| 1283.5 | 2050 | 3.70 | 90.3 | 39.5 |
| 1777.7 | 1998 | 3.848 | 85.6 | 40.5 |

EXAMPLE 6

18 weight parts of PPTA/DABPI copolymer (50% DAPBI) were dosed into a 20 mm twin screw extruder (40D). 82 weight parts of sulfuric acid were injected into the twin screw extruder after 95 mm (=4.75 D). The sulfuric acid had a purity of 99.8%. The extruder speed was 300 rpm. The vacuum level for degassing was 50 mbar (absolute pressure). The output pressure of the extruder was approximately 50 bar. The dissolving capacity was 900 g/h. The temperature of the dissolving process was 90° C. The mechanical properties are illustrated in Table 7.

TABLE 7

| Linear Density (dtex) | Breaking Tenacity (mN/tex) | Elongation at break (%) | CMA 300400 modulus (GPa) | ToAR (J/g) |
|---|---|---|---|---|
| 113 | 1404 | 5.5 | 43 | 40 |
| 112 | 1377 | 5.3 | 45 | 38 |
| 111 | 1379 | 5.2 | 46 | 38 |

TABLE 7-continued

| Linear Density (dtex) | Breaking Tenacity (mN/tex) | Elongation at break (%) | CMA 300400 modulus (GPa) | ToAR (J/g) |
|---|---|---|---|---|
| 112 | 1399 | 5.4 | 46 | 39 |
| 77 | 1346 | 4.6 | 60 | 33 |
| 77 | 1388 | 4.7 | 60 | 35 |

EXAMPLE 7

17 weight parts of PPTA/DABPI copolymer (70% DAPBI) were dosed into a 20 mm twin screw extruder (40D). 83 weight parts of sulfuric acid were injected into the twin screw extruder after 95 mm (=4.75 D). The sulfuric acid had a purity of 99.8%. The extruder speed was 300 rpm. The vacuum level for degassing was 50 mbar (absolute pressure). The output pressure of the extruder was approximately 20 bar. The dissolving capacity was 1400 g/h. The temperature of the dissolving process was 110° C. The mechanical properties are illustrated in Table 8.

TABLE 8

| Linear Density (dtex) | Breaking Tenacity (mN/tex) | Elongation at break (%) | CMA 300400 modulus (GPa) | ToAR (J/g) |
|---|---|---|---|---|
| 193 | 611 | 3.4 | 30 | 14 |
| 154 | 790 | 6.2 | 15 | 29 |

EXAMPLE 8

19 weight parts of PPTA/NDC copolymer (30% NDC) were dosed into a 20 mm twin screw extruder (40D). 81 weight parts of sulfuric acid were injected into the twin screw extruder after 95 mm (=4.75 D). The sulfuric acid had a purity of 99.8%. The extruder speed was 300 rpm. The vacuum level for degassing was 50 mbar (absolute pressure). The output pressure of the extruder was approximately 36 bar. The dissolving capacity was 1500 g/h. The temperature of the dissolving process was 80° C. The mechanical properties are illustrated in Table 9.

TABLE 9

| Linear Density (dtex) | Breaking Tenacity (mN/tex) | Elongation at break (%) | CMA 300400 modulus (GPa) | ToAR (J/g) |
|---|---|---|---|---|
| 117 | 1822 | 3.9 | 93 | 39 |
| 106 | 1835 | 3.9 | 95 | 39 |
| 101 | 1808 | 3.9 | 85 | 38 |
| 93 | 1854 | 3.8 | 98 | 39 |
| 77 | 1852 | 3.6 | 103 | 37 |
| 64 | 1767 | 3.3 | 103 | 33 |

EXAMPLE 9

19 weight parts of PPTA/NDC copolymer (50% NDC) were dosed into a 20 mm twin screw extruder (40D). 81 weight parts of sulfuric acid were injected into the twin screw extruder after 95 mm (=4.75 D). The sulfuric acid had a purity of 99.8%. The extruder speed was 300 rpm. The vacuum level for degassing was 50 mbar (absolute pressure). The output pressure of the extruder was approximately 36 bar. The dissolving capacity was 1500 g/h. The temperature of the dissolving process was 80° C. The mechanical properties are illustrated in Table 10.

TABLE 10

| Linear Density (dtex) | Breaking Tenacity (mN/tex) | Elongation at break (%) | CMA 300400 modulus (GPa) | ToAR (J/g) |
|---|---|---|---|---|
| 115 | 1601 | 3.7 | 87 | 32 |
| 103 | 1653 | 3.6 | 88 | 32 |
| 93 | 1634 | 3.5 | 94 | 32 |
| 88 | 1618 | 3.4 | 95 | 31 |
| 77 | 1581 | 3.2 | 98 | 28 |

EXAMPLE 10

19 weight parts of PPTA/NDC copolymer (70% NDC) were dosed into a 20 mm twin screw extruder (40D). 81 weight parts of sulfuric acid were injected into the twin screw extruder after 95 mm (=4.75 D). The sulfuric acid had a purity of 99.8%. The extruder speed was 300 rpm. The vacuum level for degassing was 50 mbar (absolute pressure). The output pressure of the extruder was approximately 35 bar. The dissolving capacity was 1500 g/h. The temperature of the dissolving process was 80° C. The mechanical properties are illustrated in Table 11.

TABLE 11

| Linear Density (dtex) | Breaking Tenacity (mN/tex) | Elongation at break (%) | CMA 300400 modulus (GPa) | ToAR (J/g) |
|---|---|---|---|---|
| 113 | 1463 | 3.5 | 88 | 29 |
| 103 | 1454 | 3.4 | 88 | 27 |
| 101 | 1444 | 3.2 | 94 | 26 |
| 73 | 1448 | 3.0 | 102 | 25 |
| 83 | 1444 | 3.2 | 96 | 26 |
| 73 | 1025 | 2.4 | 82 | 14 |

The invention claimed is:

1. A method for dissolving PPTA or copolymers thereof in sulfuric acid using a twin screw extruder having transporting, mixing, and kneading elements with an entering zone, an intermediate zone, a mixing zone, a negative transport zone, a degassing zone, and a pressure build-up zone, the method comprising the steps:
   transporting PPTA or copolymer thereof into the entering zone at a transport capacity that prevents sulfuric acid from entering the entering zone;
   introducing liquid sulfuric acid in the immediate zone;
   substantially fully to fully filling the mixing zone to allow sufficient time to mix and dissolve the PPTA or copolymer thereof in the sulfuric acid to obtain a PPTA sulfuric acid solution or a copolymer sulfuric acid solution;
   creating, after the mixing zone, the negative transport zone to obtain a product lock between the mixing zone and the degassing zone;
   creating a thin film of the PPTA sulfuric acid solution or the copolymer sulfuric acid solution in the degassing zone to degas the solution; and
   entering the solution into the output pressure build-up zone to partially fill the output pressure build-up zone and to leave the twin screw extruder.

2. The method according to claim 1, wherein the residence time of the PPTA or the copolymer thereof in the twin screw extruder is less than 30 minutes.

3. The method according to claim 1, wherein the entering zone has a length of 3 D to 6 D, wherein D is a diameter of the screw in millimeters, and is equipped with a single or double flighted transport element.

4. The method according to claim 1, wherein the mixing zone has a length of 20 D to 23 D, wherein D is a diameter of the screw in millimeters, and is equipped with mixing elements with and without transport character.

5. The method according to claim 1, wherein the negative transport zone has negative transport elements having a length of about 1 D, wherein D is a diameter of the screw in millimeters.

6. The method according to claim 1, wherein the degassing zone has a length of 6 D to 8 D, wherein D is a diameter of the screw in millimeters, and is equipped with transport elements.

7. The method according to claim 1, wherein the pressure build-up zone has a length of 2 D to 20 D, wherein D is a diameter of the screw in millimeters, and is equipped with conveying elements having a short lead of 0.5 D to 0.75 D.

8. The method according to claim 1, wherein the PPTA or the copolymer thereof is mixed with nanoparticles and sulfuric acid, or wherein the PPTA sulfuric acid solution or the copolymer sulfuric acid solution is mixed with nanoparticles.

9. Yarn spun with a spin dope obtained by the method of claim 1 having improved tenacity, elongation, and/or breaking energy in comparison with yarns made by mixing PPTA with sulfuric acid ice.

10. The method according to claim 1, wherein the residence time of the PPTA or the copolymer thereof in the twin screw extruder is between 2 minutes and 10 minutes.

11. The method according to claim 1, wherein the residence time of the PPTA or the copolymer thereof in the twin screw extruder is between 4 minutes and 6 minutes.

12. The method according to claim 2, wherein the entering zone has a length of 3 D to 6 D, wherein D is a diameter of the screw in millimeters, and is equipped with a single or double flighted transport element.

13. The method according to claim 2, wherein the mixing zone has a length of 20 D to 23 D, wherein D is a diameter of the screw in millimeters, and is equipped with mixing elements with and without transport character.

14. The method according to claim 2, wherein the negative transport zone has negative transport elements having a length of about 1 D, wherein D is a diameter of the screw in millimeters.

15. The method according to claim 2, wherein the degassing zone has a length of 6 D to 8 D, wherein D is a diameter of the screw in millimeters, and is equipped with transport elements.

16. The method according to claim 2, wherein the pressure build-up zone has a length of 2 D to 20 D, wherein D is a diameter of the screw in millimeters, and is equipped with conveying elements having a short lead of 0.5 D to 0.75 D.

17. The method according to claim 2, wherein the PPTA or the copolymer thereof is mixed with nanoparticles and sulfuric acid, or wherein the PPTA sulfuric acid solution or the copolymer sulfuric acid solution is mixed with nanoparticles.

18. Yarn spun with a spin dope obtained by the method of claim 2 having improved tenacity, elongation, and/or breaking energy in comparison with yarns made by mixing PPTA with sulfuric acid ice.

19. The method according to claim 3, wherein the mixing zone has a length of 20 D to 23 D, wherein D is a diameter of the screw in millimeters, and is equipped with mixing elements with and without transport character.

20. The method according to claim 3, wherein the negative transport zone has negative transport elements having a length of about 1 D, wherein D is a diameter of the screw in millimeters.

21. The method according claim 3, wherein the degassing zone has a length of 6 D to 8 D, wherein D is a diameter of the screw in millimeters, and is equipped with transport elements.

22. The method according to claim 3, wherein the pressure build-up zone has a length of 2 D to 20 D, wherein D is a diameter of the screw in millimeters, and is equipped with conveying elements having a short lead of 0.5 D to 0.75 D.

* * * * *